Aug. 19, 1969
K. M. ONNA
3,462,683
METHOD AND APPARATUS FOR DETERMINING THE RELATIVE
VOLUME OF CRYSTALLINE SOLIDS IN SOLUTION HAVING
AT LEAST ONE PAIR OF ELECTRODES WITH ELECTRODE
SPACING LESS THAN CRYSTAL SEPARATION DISTANCE
Filed Dec. 7, 1966
2 Sheets-Sheet 1
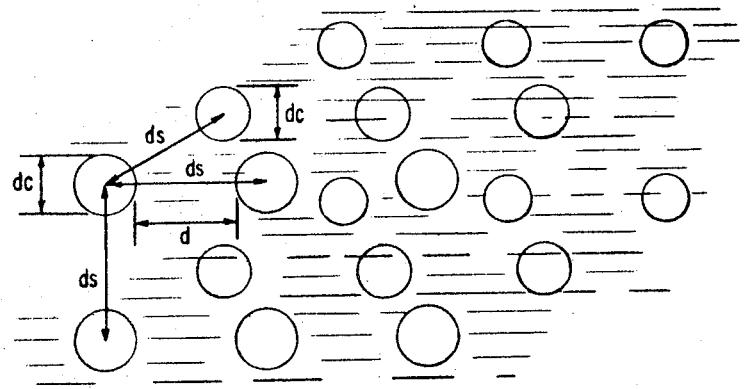
FIG. 1
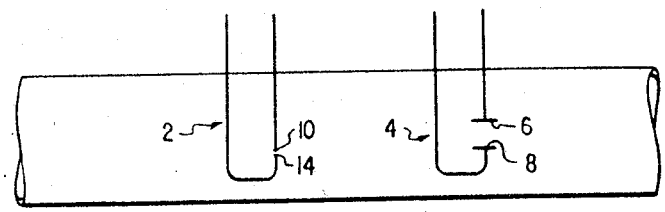
FIG. 2
FIG. 4
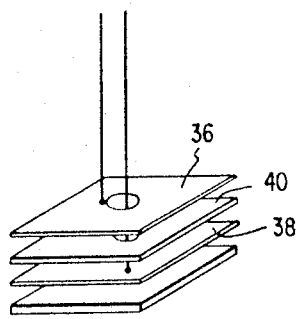
INVENTOR
KENNETH M. ONNA
BY
ATTORNEYS

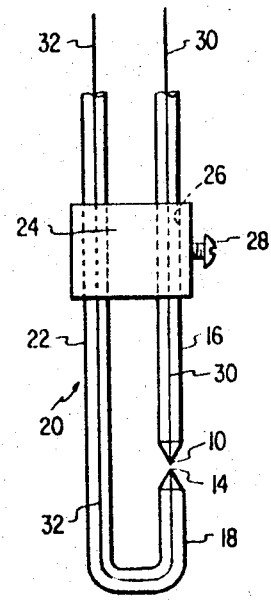
FIG. 3
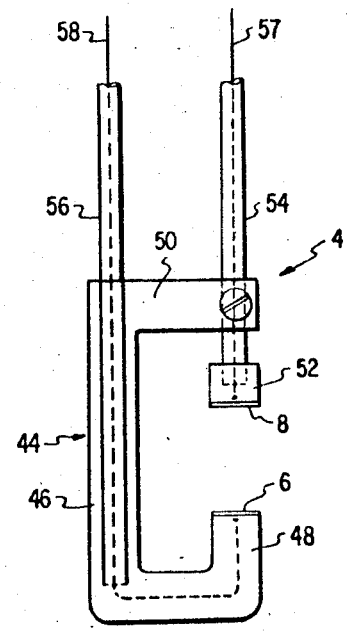
FIG. 5
FIG. 6
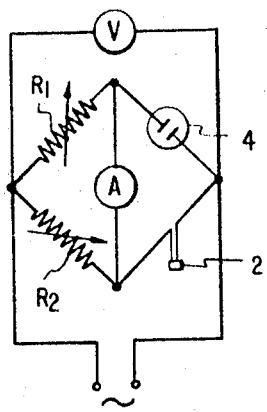
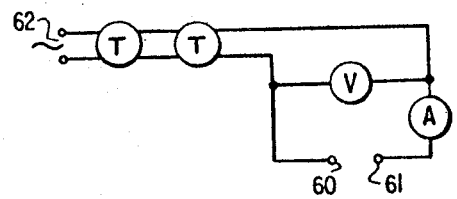
FIG. 7
INVENTOR
KENNETH M. ONNA
BY
ATTORNEYS.

United States Patent Office
3,462,683
Patented Aug. 19, 1969

3,462,683
METHOD AND APPARATUS FOR DETERMINING THE RELATIVE VOLUME OF CRYSTALLINE SOLIDS IN SOLUTION HAVING AT LEAST ONE PAIR OF ELECTRODES WITH ELECTRODE SPACING LESS THAN CRYSTAL SEPARATION DISTANCE
Kenneth M. Onna, Honolulu, Hawaii, assignor to Hawaiian Sugar Planters' Association, Honolulu, Hawaii, a voluntary, nonprofit agricultural organization
Filed Dec. 7, 1966, Ser. No. 599,892
Int. Cl. G01r 27/02
U.S. Cl. 324—65                                    4 Claims

ABSTRACT OF THE DISCLOSURE

The relative volume of crystalline solids in a crystallizing solution or mother liquor, such as a sugar solution, is measured by comparing the electrical resistance of the mother liquor wherein uniformly separated, identical crystals are present, with the resistance of the mother liquor alone. The resistance of the mother liquor alone is derived by utilizing a pair of electrodes spaced apart by less than the uniform separation distance between adjacent crystals.

Background of invention

In crystallizing sugar from saturated sugar solutions during refining it is important, for a variety of reasons, to determine the relative volume of crystalline, solid sugar present in the solution. For example, one particularly important reason is that the relative volume of crystalline solids is a critical factor affecting the mobility of the solution, which mobility must be closely controlled if various mechanical limitations of the usual sugar machinery used in crystallization are not to be exceeded.

Determination of the relative volume of crystalline solids in the solution is usually performed at present by a process involving intermittent sampling of the solution with weighing of the sample prior and subsequent to removal of the liquid in the sample. Such a process involving intermittent determination may prove unsatisfactory for close control of the crystallization process, particularly in situations where the relative volume of crystalline solids present in the solution is changing rapidly. For this reason interest has been shown from time to time in the possibility of developing a method for continuous measurement of relative volume of crystalline solids in a crystallizing solution.

One approach to the general problem of providing continuous measurement of the relative volume of disposed nonconducting solids in a conductive liquid carrier utilizes the known property that the electrical resistance of the mixture changes with the relative volume of solids in the liquid. Typically an apparatus utilizing this approach compares the resistance of the electrical paths between one pair of electrodes immersed in the dispersion with the resistance of the electrical path between another, identical, nonresponsive, pair of electrodes immersed in the dispersion but from between which the solids are excluded by physical barrier such as a mesh screen or tank wall surrounding the electrodes. See U.S. Patent 2,083,074. As the electrode pairs and the liquid carrier in which they are immersed are identical the only factor affecting the difference in the resistances of the electrical paths defined by the two electrode pairs is the presence of solids between the electrodes of the responsive pair. Such an apparatus utilizing a physical barrier to exclude solids from between the nonresponsive pair of electrodes may prove unsatisfactory in the particular situation where the solid particles dispersed in a liquid carrier comprise a crystallizing solution. In this event there is a strong likelihood of spontaneous origination of fresh crystals within that portion of the mother liquor lying inside the physical barrier and between the electrodes. For this and other reasons it has therefore not been possible hitherto to provide a generally satisfactory method and apparatus for providing continuous measurement of the relative volume of crystalline solids present in a crystallizing solution.

Summary of invention

It is therefore a particular object of the present invention to provide a method for continuously and instantaneously measuring the relative volume of crystalline solids in a crystallizing solution.

It is in another object of the invention to provide an apparatus for measuring the relative volume of crystalline solids in a crystallizing solution so constructed as to be capable of continuous operation.

The drawings

In accordance with these objects, an apparatus forming one preferred embodiment of the present invention for carrying out the method thereof is illustrated in the accompanying drawings in which:

FIGURE 1 is a simplified, diagramatic representation of the manner in which the crystals may be assumed to be arranged within a crystallizing solution of the type suitable for measurement by the present invention;

FIGURE 2 is a side view of the preferred embodiment of the present invention immersed in a solution of the type shown in FIGURE 1;

FIGURE 3 is a side view of a nonresponsive pair of electrodes forming a part of the apparatus shown in FIGURE 2;

FIGURE 4 is an alternative embodiment of the preferred form of electrode shown in FIGURE 3;

FIGURE 5 is a side view of a responsive pair of electrodes forming a part of the apparatus shown in FIGURE 2;

FIGURE 6 is a schematic representation of a simple electrical circuit used in conjunction with the apparatus shown in FIGURE 2; and FIGURE 7 is a view of an alternative form of electrical circuit which may be used in conjunction with the apparatus shown in FIGURE 2.

Detailed description

In describing the preferred embodiment of the invention, it is first necessary to explain certain assumed physical characteristics of a crystallizing solution of the type suitable for measurement by the method and apparatus of the present invention. A diagrammatic representation on an exaggerated scale of a saturated solution possessing these characteristics, shown in FIGURE 1, includes a plurality of identical monoclinic or assumed spherical sugar crystals of average diameter $d_c$. Each crystal is assumed to lie at the center of a spherical environment of diameter $d_s$, whose boundary is in contact with identical spherical environments of other crystals. Although at local points in the mother liquor the particles may not be uniformly dispersed, it is not an inaccurate generalization in considering an agitated solution to postulate a uniform spacing of the type shown.

Given a crystallizing solution having these characteristics, it is possible to derive a relation between relative volume of crystalline solids in solution (denoted CV), uniform spacing distance beween the closest peripheral surfaces of adjacent crystals (denoted $d$) and crystal diameter $d_c$, as follows:

Volume of a crystal, $$V_c = \frac{\pi d_c^3}{6} \quad (1)$$

Volume of spherical environment enclosing each crystal, $$V_e = \frac{\pi d_s^3}{6} \qquad (2)$$

Then $$CV = \frac{V_c}{V_e} = \frac{d_c^3}{d_s^3} \qquad (3)$$

Also $$d = d_s - d_c \qquad (4)$$

Hence it follows by substitution $$d = d_c\left(\left(\frac{1}{CV}\right)^{1/3} - 1\right) \qquad (5)$$

For example using Equation 5 for a typical crystallizing sugar solution containing crystals of 1.50 mm. diameter at a relative volume of crystalline solids of 45%, the uniform spacing distance is calculated to be 0.46 mm.

In crystallizing sugar solutions, it is known that the crystallization process may be controlled by various known techniques to produce crystals of a predetermined size. It is therefore obvious that for any particular value of relative volume of crystalline solids (CV), the uniform separation distance (d) between the crystals may be calculated by simple mathematics from Equation 5 above as a function of the known and controlled crystal dimension.

It is also a known property of pure sugar solutions and of solid sugar crystals that they are in themselves nonductive to electricity, but that sugar solutions encountered during refining are rendered conductive by the presence of impurities normally present in the solution. Thus the presence of nonconducting sugar crystals in sugar solution will tend to increase the specific resistance of the mixture as opposed to the specific resistance of the sugar solution or mother liquor alone. Furthermore, the specific resistance tends to be changed in proportion to the concentration of the sugar crystals present in the solution.

Referring to FIGURE 2, the preferred embodiment of the apparatus suitable for performing the method of the invention is shown to include nonresponsive and responsive electrode pairs 2 and 4 respectively immersed in a solution possessing the characteristics described above. The electrical path between electrode elements 6 and 8 of the electrode pair 4 is such as to include several of the crystals so that the specific resistance of that portion of the solution present between elements 6 and 8 is relatively increased as compared with that of the mother liquor alone. The electrode elements 10 and 14 of the electrode pair 4, however, are so positioned (to be described hereinafter) to reduce the possibility that the electrical path between them will include any crystals, with the result that the specific resistance of the portion of fluid between the elements 10 and 14 remains substantially equal to that of the mother liquor irrespective of the concentration of crystals in the body of the solution. As other factors affecting specific resistance such as the nature and amount of dissolved impurities, changes in viscosity, etc., change the conductivity of the portions of the mother liquor between each of the two electrode pairs equally, it may be assumed that such changes in specific resistance as occur between these portions of the fluid must be due to the presence of sugar crystals. Thus the change in specific resistance may be used to provide a measure of the relative volume of crystalline solids present in the solution.

Referring to FIGURE 3, the nonresponsive electrode pair 2 includes a downwardly directed tube 16 of insulating material, such as glass, having a pointed lower end. Spaced below and longitudinally aligned with the tube 16 is a pointed upwardly directed arm 18 of similar material forming the shorter limb of a generally J shaped glass rod 20, having a longer upwardly directed arm 22. A block 24 fixedly secured to the limb 22 includes a vertical bore 26, aligned with the shorter limb 18 and slidably receiving the rod 16, which may be adjusted to any desired vertical spacing above the limb 18 by a set screw 28 intersecting the bore 26. Running continuously along the center lines of the rods 16 and 20 are electrical conductors 30 and 32 respectively which in the preferred embodiment are stainless steel. The terminations of the conductors 30 and 32 at the opposed pointed extremities of the rods 16 and 20, define the previously mentioned electrode elements 10 and 14. By moving the rod 16 vertically, the longitudinal spacing between the electrode elements 10 and 14 may be finely adjusted.

In use, the desired range of relative volume of crystalline solids for which the invention is to be used, and the predetermined crystal size are known. It is therefore a simple matter, as previously described, to calculate from these known properties the uniform separation distance (d) between the closest peripheral points of adjacent crystals for a maximum value of the range of relative volume of crystalline solids considered. The rod 16 may then be adjusted to space the elements 10 and 14 longitudinally apart by a distance less than the uniform separation distance (d) calculated. When the electrode pair 2 is thereafter immersed in the solution, the electrode elements 10 and 14 are likely to lie between adjacent crystals or at the most to embrace only one crystal with the result that the electrical path between the electrode elements 10 and 14 is substantially unaffected by the presence of crystals in that path. In this manner it will be seen that the resistance of the electrical path between the elements of the electrode pair 2 is generally unresponsive to the presence of crystals in the sugar solution.

The present construction offers particular advantages in the case of a crystallizing solution as the possibility of spontaneous origination of crystals within the electrical path defined by the electrode elements of the nonresponsive pair is substantially minimized by the manner in which the dimension of the electrical path between the elements is chosen to be less than the uniform separation distance (d) between adjacent crystals.

Another embodiment of the nonresponsive electrode pair is shown in FIGURE 4. This embodiment includes two thin parallel flat metal sheets 36 and 38, separated by a nonconducting insulating film 40. The thickness of the insulating film 40 determining the separation of the edges of the plates 36 and 38, is made less than the uniform separation distance (d) between the crystals, so that the electrical path between these edges is similarly substantially unaffected by the presence of crystals.

Referring to FIGURE 5 previously mentioned, the responsive electrode pair 4 may be seen to include a generally "G" shaped insulating body 44, including parallel, spaced long and short vertical portions 46 and 48 respectively and an upper horizontal portion 50. The upper end of the short vertical portion 48 is provided with a horizontally disposed metal disc defining the previously mentioned electrode element 6. Spaced above the electrode 6, in oposition thereto, in a similar horizontal metal disc defining the previously mentioned electrode 8. The electrode 8 is supported on a circular insulating member 52 which is supported at the lower extremity of a vertical rod 54, slidably received in a vertical bore in the horizontal portion 50. The spacing of electrodes 6 and 8 may be adjusted by a set screw 55 in the horizontal portion 50, contacting the rod 54. Another vertical rod 56, parallel to the rod 54, is positioned within and extends upwardly from the longer vertical portion 46 of the base 44. Electrical leads 57 and 58 pass through the rods 54 and 56 to the electrodes 8 and 6 respectively. The electrode elements 6 and 8 are spaced apart a substantially greater distance than the uniform separation distance (d) between adjacent crystals so that a substantial number of crystals may be included in the electrical path between the oposed faces of the electrodes 6 and 8. The diameters of the electrodes 6 and 8 are large relative to the uniform separation distance (d), to increase the volume of solution between the electrodes defining the electrical path. In this manner an electrical path whose resistance is highly responsive to the presence of nonconducting crystals in the solution is provided.

The specific resistances of the portions of solution lying in the electrical paths defined by the two electrode pairs, are compared by a conventional Wheatstone bridge circuit shown in FIGURE 6. As the volumes of liquid embraced in the two electrical paths differ due to the relatively wider area and greater spacing of the responsive pair of electrodes 4, it is necessary to include a conventional potential dividing circuit (not shown) for the purpose of comparing the resistances of the electrical paths defined by the two electrode pairs on a common basis of specific resistance.

Electrode pairs 2 and 4 are connected in series across an ammeter A. Also connected across the ammeter A are series connected variable resistors $R_1$ and $R_2$. A potential is applied between the point of connection of the resistors $R_1$ and $R_2$ and the point of connection of electrode pairs 2 and 4. Preferably the source of potential is an alternating current source to avoid polarization of the solution at the electrode elements. The values of the resistors $R_1$ and $R_2$ may be suitably set so that zero current flows through the ammeter A at a suitable predetermined minimum value of relative volume of crystalline solids. As the relative volume of crystalline solids increases, the number of crystals lying between the electrode elements of the responsive electrode pair 4 correspondingly increases so that the resistance of the electrical path between these electrodes is proportionately changed. Such change of resistance from the initial balanced condition causes a current to flow through the ammeter A. It is possible by suitable calibration to relate the deflection of ammeter directly to relative volume of crystalline solids in the solution.

An alternative circuit for calculating the change in resistance ratios of the two electrode pairs 2 and 4 caused by change in relative value of crystalline solids is shown in FIGURE 7. In this circuit a voltage from a constant AC source may be separately applied to each of the electrode pairs 2 and 4. The circuit includes variable transformers T for controlling the voltage applied to each electrode pair and an ammeter in series with the source of potential and the selected electrode pair. By successively applying a constant voltage to each electrode pair and noting the differing currents passing through the ammeter, it is possible to derive a current ratio propertional to the resitsance ratio of the two electrode pairs and hence to derive a measure of relative volume of crystalline solids.

It will be seen that the method of the present invention permits continuous and instantaneous measurement of the relative volume of a crystalline solid in a crystallizing solution to be provided in a simple and effective manner. In particular the provision of a nonresponsive electrode pair which is so dimensioned as to substantially exclude crystals from the electrical path defined by it provides a reference standard for comparison against the responsive electrode pair, thereby compensating for the effects of other factors changing the specific resistance of the solution such as concentration of dissolved impurities, etc. A particular advtange of the particular construction of the nonresponsive pair of electrodes is the manner in which such construction minimizes the possibility of spontaneous generation of substantial numbers of crystals within the electrical path between the elements. Additional advantages are provided by the adjustable mounting of the electrode elements of the nonresponsive pair which permits the characteristics of the nonreresponsive pair to be varied, as may be required for use with solutions of differing crystal dimension.

I claim:

1. In a method for measuring the relative volume of crystalline solids in a crystallizing solution containing solid crystals of relatively low electrical conductivity dispersed at a uniform separation distance between the closest peripheral surfaces of adjacent crystals in a mother liquor of relatively high electrical conductivity, the improvement which comprises:

providing a first pair of spaced electrodes which are immersed in the solution, the spacing between the electrodes being less than the uniform separation distance between the adjacent crystals;

providing a second pair of spaced electrodes which are immersed in the same solution, the spacing between the electrodes being substantially greater than the uniform separation distance between adjacent crystals;

deriving an electrical signal proportional to the resistance of an electrical current path between the first pair of electrodes;

deriving another electrical signal proportional to the resistance of an electrical current path between the second pair of electrodes immersed in the same solution; and comparing the signals.

2. A method for measuring the relative volume of sugar crystals in a crystallizing sugar solution wherein electrically nonconductive, solid, sugar crystals of predetermined size are dispersed at a substantially uniform predetermined separation distance between the closest peripheral surfaces of adjacent crystals in an electrically conducting mother liquor, the method comprising the steps of:

immersing two pairs of electrodes defined as a responsive pair and a nonresponsive pair in the solution;

spacing the electrodes of the responsive pair apart by distance greater than the uniform separation distance between the adjacent crystals so that the resistance of that portion of the solution disposed in an electrical path between the electrodes of the responsive pair is determined by the presence of crystals between the electrodes;

spacing the electrodes of the nonresponsive pair of electrodes apart by a distance less than the uniform separation distance between adjacent crystals to substantially exclude such crystals from between the electrodes so that the resistance of the electrical path between the electrodes of the nonresponsive pair is substantially unaffected by the presence of crystals in the mother liquor; and measuring the ratio of the resistances of the electrical paths defined by the pairs of electrodes.

3. An apparatus for measuring the relative volume of crystalline solids in a crystallizing solution characterized by electrically nonconductive, solid, crystals dispersed at a uniform separation distance between the closest peripheral surfaces of adjacent crystals in an electrically conductive mother liquor, the apparatus comprising:

a responsive pair of electrodes adapted for immersion in the solution, said responsive pair of electrodes including opposed electrode elements spaced apart by a distance greater than the uniform separation distance between adjacent crystals so as to include various crystals in the electrical path between said electrode elements of said responsive pair;

a nonresponsive pair of electrodes adapted for immersion in the solution, said nonresponsive pair including electrode elements spaced apart by a distance less than the uniform separation distance between adjacent crystals so as to substantially exclude any of said crystals from the electrical path between the electrode elements of said nonresponsive pair; and circuit means for comparing the ratio of the resistances of the electrical paths defined by said responsive and said nonresponsive electrode pairs.

4. In a method for measuring the relative volume of crystalline solids in a crystallizing solution containing solid crystals of relatively low electrical conductivity dispersed at substantially uniform separation distances between the closest peripheral surfaces of adjacent crystals in a mother liquor of relatively high electrical conductivity, the improvement which comprises:
- providing a first pair of spaced electrodes which are immersed in the solution, the spacing between the electrodes preventing the embracement of more than one crystal;
- providing a second pair of spaced electrodes which are immersed in the same solution, the spacing between the electrodes allowing embracement of a plurality of crystals;
- deriving an electrical signal proportional to the resistance of an electrical current path between the first pair of electrodes;
- deriving another electrical signal proportional to the resistance of an electrical current path between the second pair of electrodes immersed in the same solution; and
- comparing the signals.

References Cited

UNITED STATES PATENTS

| | | | |
|---|---|---|---|
| 1,479,087 | 1/1924 | Rice | 324—30 |
| 2,083,074 | 6/1937 | Maass | 324—30 |
| 3,233,173 | 2/1966 | Lees et al. | |
| 3,358,223 | 12/1967 | Birnstingle | 324—30 |

EDWARD E. KUBASIEWICZ, Primary Examiner

J. M. HANLEY, Assistant Examiner

U.S. Cl. X.R.

324—30, 71